(12) United States Patent
Liu et al.

(10) Patent No.: US 11,869,180 B1
(45) Date of Patent: Jan. 9, 2024

(54) MEASUREMENT METHOD AND SYSTEM OF UNDEFORMED CHIP THICKNESS IN MICRO-MILLING

(71) Applicant: SOOCHOW UNIVERSITY, Suzhou (CN)

(72) Inventors: Tongshun Liu, Suzhou (CN); Kedong Zhang, Suzhou (CN); Chengdong Wang, Yihuai (CN); Xuhong Guo, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 0 days.

(21) Appl. No.: 18/032,445

(22) PCT Filed: Jul. 12, 2022

(86) PCT No.: PCT/CN2022/105062
§ 371 (c)(1),
(2) Date: May 11, 2023

(87) PCT Pub. No.: WO2023/077856
PCT Pub. Date: May 11, 2023

(30) Foreign Application Priority Data

Nov. 5, 2021 (CN) .......................... 202111306045.8

(51) Int. Cl.
*G06T 7/00* (2017.01)
*G06T 7/62* (2017.01)

(52) U.S. Cl.
CPC .............. *G06T 7/0004* (2013.01); *G06T 7/62* (2017.01); *G06T 2207/10056* (2013.01); *G06T 2207/30136* (2013.01)

(58) Field of Classification Search
CPC ....... G06T 7/00; G06T 7/0002; G06T 7/0004; G06T 2207/30108; G06T 2207/30136;
(Continued)

(56) References Cited

U.S. PATENT DOCUMENTS

2005/0089379 A1   4/2005   Francis et al.

FOREIGN PATENT DOCUMENTS

| CN | 110270705 A | 9/2019 |
| CN | 113297696 A | 8/2021 |
| CN | 114119501 A | 3/2022 |

OTHER PUBLICATIONS

Jing, Xiubing, et al. "A novel run-out model based on spatial tool position for micro-milling force prediction." Journal of Manufacturing Processes 68 (2021): 739-749. (Year: 2021).*

(Continued)

*Primary Examiner* — Geoffrey E Summers
(74) *Attorney, Agent, or Firm* — SZDC Law PC

(57) ABSTRACT

The invention provides a measurement method and system of undeformed chip thickness in micro-milling. This method includes the steps of: S1: acquiring a surface topography picture of the bottom of a flute after micro-milling; S2: extracting a tool mark at the central line of the flute from the surface topography picture; S3: calculating a spacing distance between adjacent tool marks and calculating the difference of equivalent cutting radius between adjacent cutter teeth based on the spacing distance between adjacent tool marks; and S4: reconstructing the instant undeformed chip thickness in micro-milling based on the difference of equivalent cutting radius between adjacent cutter teeth. The measurement method and system of undeformed chip thickness in micro-milling allow undeformed chip thickness measurement in micro-milling without measuring the tool runout and wear in advance, which significantly shortens the measurement flow and improves the measurement efficiency while effectively ensuring the measurement accuracy.

10 Claims, 2 Drawing Sheets

(58) Field of Classification Search
CPC . G06T 2207/30164; G06T 2207/10056; G06T 7/60; G06T 7/62; B23Q 15/16; B23Q 15/18; B23Q 15/28
See application file for complete search history.

(56) References Cited

OTHER PUBLICATIONS

Chen, Wanqun, et al. "A new surface topography-based method to quantify axial error of high speed milling cutters." Journal of Manufacturing Science and Engineering 140.11 (2018): 111014. (Year: 2018).*

Attanasio, Aldo. "Tool run-out measurement in micro milling." Micromachines 8.7 (2017): 221. (Year: 2017).*

Liu, Tongshun, Kunpeng Zhu, and Gang Wang. "Micro-milling tool wear monitoring under variable cutting parameters and runout using fast cutting force coefficient identification method." The International Journal of Advanced Manufacturing Technology 111 (2020): 3175-3188. (Year: 2020).*

Lu, Xiaohong, et al. "Model of the instantaneous undeformed chip thickness in micro-milling based on tooth trajectory." Proceedings of the Institution of Mechanical Engineers, Part B: Journal of Engineering Manufacture 232.2 (2018): 226-239. (Year: 2018).*

Nakkiew, Wasawat, Chi-Wei Lin, and Jay F. Tu. "A new method to quantify radial error of a motorized end-milling cutter/spindle system at very high speed rotations." International Journal of Machine Tools and Manufacture 46.7-8 (2006): 877-889. (Year: 2006).*

O'Toole, Lorcan, Cheng-Wei Kang, and Feng-Zhou Fang. "Precision micro-milling process: state of the art." Advances in Manufacturing 9 (2021): 173-205. (Year: 2020).*

\* cited by examiner

MEASUREMENT METHOD AND SYSTEM OF UNDEFORMED CHIP THICKNESS IN MICRO-MILLING

This application is the National Stage Application of PCT/CN2022/105062, filed on Jul. 12, 2022, which claims priority to Chinese Patent Application No. 202111306045.8, filed on Nov. 5, 2021, which is incorporated by reference for all purposes as if fully set forth herein.

FIELD OF THE INVENTION

The present invention relates to the technical field of micro-milling measurements, and more particularly to a measurement method and system of undeformed chip thickness in micro-milling.

DESCRIPTION OF THE RELATED ART

Micro-milling is an efficient micro-machining technique that has a broad prospect of application in the field of micro-parts machining. The undeformed chip thickness corresponds to the chip load, which directly affects the cutting performance of micro-milling, such as cutting force, vibration and surface quality. Accurate measurement of undeformed chip thickness is of great significance for improvement in micro-milling performance. The undeformed chip thickness in traditional milling can be determined by the feed per tooth. However, the feed per tooth is small in micro-milling, and the tool runout and resultant asymmetric wear have very significant impact on the undeformed chip thickness. To measure the undeformed chip thickness in micro-milling, it is usually necessary to measure the tool runout and wear in advance, which greatly reduces the measurement efficiency. Therefore, it is particularly urgent to develop an efficient measurement method of undeformed chip thickness in micro-milling without measuring tool runout and wear.

At present, academic and industrial circles have made a lot of research on the measurement of micro-milling tool runout and wear, but there are few reports on the method of undeformed chip thickness measurement. Although the undeformed chip thickness can be estimated by measuring the tool runout and the asymmetry of tool wear, with this method, it is difficult to make online measurements, and measuring the runout and wear in advance will greatly reduce the measurement efficiency.

SUMMARY OF THE INVENTION

The present invention aims to address the technical problem of providing a measurement method of undeformed chip thickness in micro-milling that allows undeformed chip thickness measurement in micro-milling without measuring the tool runout and wear in advance, which significantly shortens the measurement flow and improves the measurement efficiency.

To address the problem mentioned above, the present invention provides a measurement method of undeformed chip thickness in micro-milling, including the steps of:

S1: acquiring a surface topography picture of the bottom of a flute after micro-milling;

S2: extracting a tool mark at the central line of the flute from the surface topography picture;

S3: calculating a spacing distance between adjacent tool marks and calculating the difference of equivalent cutting radius between adjacent cutter teeth based on the spacing distance between adjacent tool marks; and S4: reconstructing the instantaneous undeformed chip thickness in micro-milling based on the difference of equivalent cutting radius between adjacent cutter teeth.

As a further improvement of the present invention, in the step S3:

if all the cutter teeth are engaged in cutting, then the difference of equivalent cutting radius $\Delta R_{k,k-1}$ between adjacent cutter teeth is calculated based on the space between adjacent tool marks according to the formula:

$$\Delta R_{k,k-1} = d_{k,k-1} - f_z$$

where $d_{k,k-1}$ is the spacing distance between adjacent tool marks and $f_z$ is the feed per tooth.

As a further improvement of the present invention, in the step S3:

if there is any cutter tooth that is not engaged in cutting, then the difference between the equivalent radius of the cutter tooth that is not engaged in cutting and the equivalent radius of any one cutter tooth is set to negative infinity; and for the cutter tooth engaged in cutting, the difference of equivalent radius between adjacent cutter teeth is calculated based on the formula:

$$\Delta R_{k,k-i} = d_{k,k-i} - i \cdot f_z$$

where i is the difference of sequence number between two adjacent cutter teeth engaged in cutting.

As a further improvement of the present invention, if there is any cutter tooth that is not engaged in cutting, the sequence number of the cutter tooth that is not engaged in cutting is determined based on the periodicity of a cutting force signal.

As a further improvement of the present invention, in the step S4, the instantaneous undeformed chip thickness in micro-milling is reconstructed based on the difference of equivalent cutting radius between any two cutter teeth according to the formula:

$$h_k(\theta) = \max\left\{\min_m\left[\Delta R_{k,m} + f_z \sin(\theta_k) \frac{M \cdot \Delta \theta_{m,k}}{2\pi}\right], 0\right\}$$

where $h_k(\theta)$ is the instantaneous undeformed chip thickness of the k-th cutter tooth at the reference tooth position angle $\theta$, $\Delta R_{k,m}$ is the difference of equivalent radius between any two cutter teeth, $\theta_k$ is the rotation angle of the k-th cutter tooth at the reference tooth position angle $\theta$, M is the number of cutter teeth, and $\Delta \theta_{m,k}$ is the angle by which the m-th cutter tooth is ahead of the k-th cutter tooth in the rotation direction of the tool.

As a further improvement of the present invention, in the step S1, a surface topography picture of the bottom of a flute after micro-milling is acquired by an optical microscope.

To address the technical problem mentioned above, the present invention further provides a measurement system of undeformed chip thickness in micro-milling, including:

an acquisition module configured to acquire a surface topography picture of the bottom of a flute after micro-milling;

a tool mark extraction module configured to extract a tool mark at the central line of the flute from the surface topography picture;

a spacing distance calculation module for adjacent tool marks configured to calculate a spacing distance between adjacent tool marks; and a calculation module of equivalent cutting radius difference configured to calculate the difference of equivalent cutting radius between adjacent cutter teeth based on the spacing distance between adjacent tool marks; and an undeformed chip thickness calculation module configured to reconstruct the instantaneous undeformed chip thickness in micro-milling based on the difference of equivalent cutting radius between adjacent cutter teeth.

As a further improvement of the present invention, the calculating the difference of equivalent cutting radius between adjacent cutter teeth based on the spacing distance between adjacent tool marks includes:

if all the cutter teeth are engaged in cutting, then calculating the difference of equivalent cutting radius $\Delta R_{k,k-1}$ between adjacent cutter teeth based on the space between adjacent tool marks according to the formula:

$$\Delta R_{k,k-1} = d_{k,k-1} - f_z$$

where $d_{k,k-1}$ is the spacing distance between adjacent tool marks and $f_z$ is the feed per tooth.

As a further improvement of the present invention, the calculating the difference of equivalent cutting radius between adjacent cutter teeth based on the spacing distance between adjacent tool marks further includes:

if there is any cutter tooth that is not engaged in cutting, then setting the difference between the equivalent radius of the cutter tooth that is not engaged in cutting and the equivalent radius of any one cutter tooth to negative infinity; and for the cutter tooth engaged in cutting, calculating the difference of equivalent radius between adjacent cutter teeth based on the formula:

$$\Delta R_{k,k-i} = d_{k,k-i} - i \cdot f_z$$

where i is the difference of sequence number between two adjacent cutter teeth engaged in cutting.

As a further improvement of the present invention, the instantaneous undeformed chip thickness in micro-milling is reconstructed based on the difference of equivalent cutting radius between any two cutter teeth according to the formula:

$$h_k(\theta) = \max\left\{\min_m\left[\Delta R_{k,m} + f_z \sin(\theta_k)\frac{M \cdot \Delta \theta_{m,k}}{2\pi}\right], 0\right\}$$

where $h_k(f)$ is the instantaneous undeformed chip thickness of the k-th cutter tooth at the reference tooth position angle $\theta$, $\Delta R_{k,m}$ is the difference of equivalent radius between any two cutter teeth, $\theta_k$ is the rotation angle of the k-th cutter tooth at the reference tooth position angle $\theta$, M is the number of cutter teeth, and $\Delta \theta_{m,k}$ is the angle by which the m-th cutter tooth is ahead of the k-th cutter tooth in the rotation direction of the tool.

The present invention has the following beneficial effects:

The measurement method and system of undeformed chip thickness in micro-milling according to the present invention allow undeformed chip thickness measurement in micro-milling without measuring the tool runout and wear in advance, which significantly shortens the measurement flow and improves the measurement efficiency while effectively ensuring the measurement accuracy.

The above description is merely a summary of the technical solutions of the present invention. To facilitate more clear understanding of the technical means of the present invention, it can be implemented according to the specification. To make the above and other objects, features and advantages of the present invention more obvious and understandable, the following preferred embodiments will be described in detail with reference to the accompanying drawings.

DETAILED DESCRIPTION OF THE PREFERRED EMBODIMENTS

The present invention will be further explained with reference to the following drawings and particular embodiments, so that those skilled in the art can better understand and implement the present invention. However, the listed embodiments should not be taken as a limitation of the present invention.

First Embodiment

Figure 1:
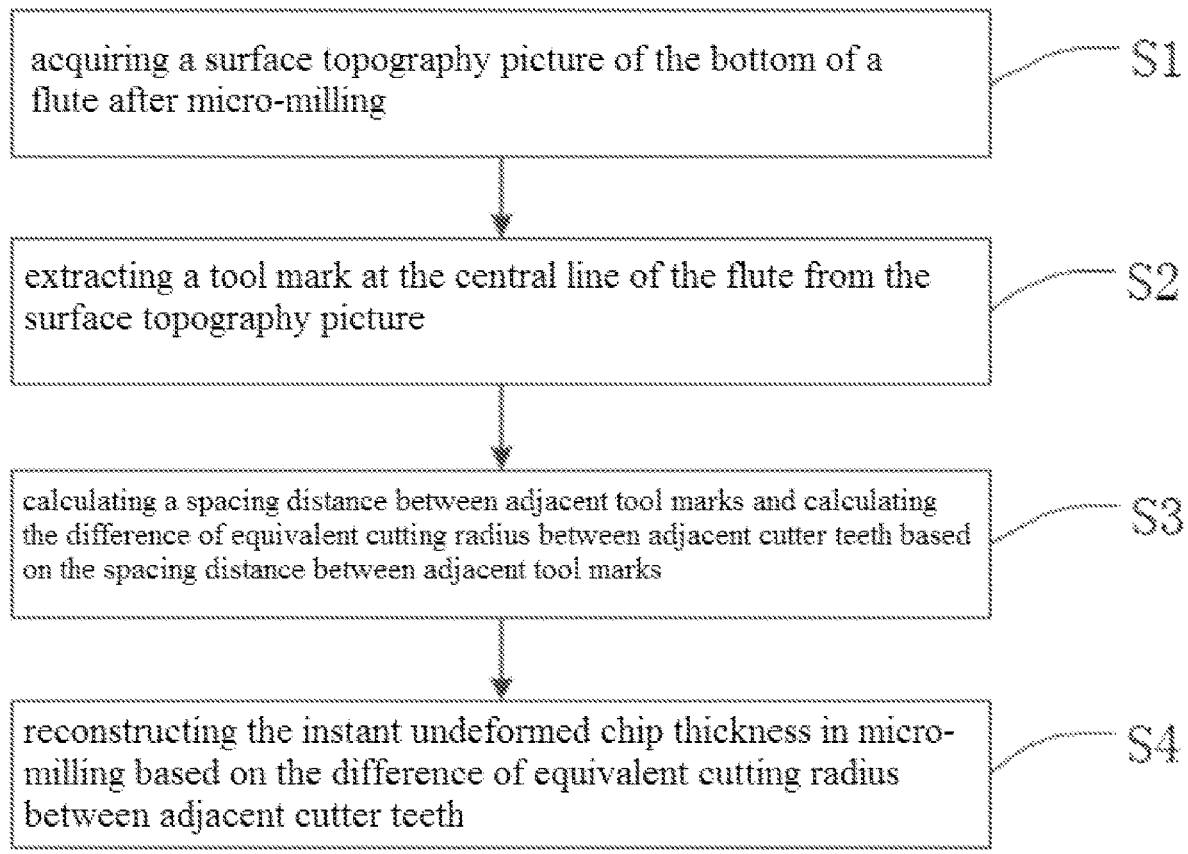
FIG. 1 is a flowchart of a measurement method of undeformed cutting thickness in micro-milling according to a first embodiment of the present invention.

As shown in FIG. 1, the measurement method of undeformed chip thickness in micro-milling according to a preferred embodiment of the present invention includes the following steps.

S1: acquiring a surface topography picture of the bottom of a flute after micro-milling. Optionally, the surface topography picture of the bottom of a flute after micro-milling is acquired by an optical microscope and has high contrast and resolution.

S2: extracting a tool mark at the central line of the flute from the surface topography picture.

S3: calculating a spacing distance between adjacent tool marks and calculating the difference of equivalent cutting radius between adjacent cutter teeth based on the spacing distance between adjacent tool marks. Specifically, the step S3 includes:

S31: if all the cutter teeth are engaged in cutting, then calculating the difference of equivalent cutting radius $\Delta R_{k,k-1}$ between adjacent cutter teeth based on the space between adjacent tool marks according to the formula:

$$\Delta R_{k,k-1} = d_{k,k-1} - f_z \quad (1)$$

where $d_{k,k-1}$ is the spacing distance between adjacent tool marks and $f_z$ is the feed per tooth.

Further, the Step S3 further includes:

S32: if there is any cutter tooth that is not engaged in cutting, then setting the difference between the equivalent radius of the cutter tooth that is not engaged in cutting and the equivalent radius of any one cutter tooth to negative infinity; and for the cutter tooth engaged in cutting, calculating the difference of equivalent radius between adjacent cutter teeth based on the formula:

$$\Delta R_{k,k-i} = d_{k,k-i} - i \cdot f_z \quad (2)$$

where i is the difference of sequence number between two adjacent cutter teeth engaged in cutting.

In this step, if there is any cutter tooth that is not engaged in cutting, the sequence number of the cutter tooth that is not engaged in cutting is determined based on the periodicity of a cutting force signal.

The steps S31 and S32 in combination can determine the difference of equivalent radius $\Delta R_{k,m}$ between any two cutter teeth, where k represents the k-th cutter tooth and m represents the m-th cutter tooth.

S4: reconstructing the instant undeformed chip thickness in micro-milling based on the difference of equivalent cutting radius between adjacent cutter teeth.

Specifically, the instantaneous undeformed chip thickness in micro-milling is reconstructed based on the difference of equivalent cutting radius between any two cutter teeth according to the formula:

$$h_k(\theta) = \max\left\{\min_m\left[\Delta R_{k,m} + f_z \sin(\theta_k)\frac{M \cdot \Delta \theta_{m,k}}{2\pi}\right], 0\right\} \quad (3)$$

Where $h_k(\theta)$ is the instantaneous undeformed chip thickness of the k-th cutter tooth at the reference tooth position angle $\theta$, $\Delta R_{k,m}$ is the difference of equivalent radius between any two cutter teeth, $\theta_k$ is the rotation angle of the k-th cutter tooth at the reference tooth position angle $\theta$, M is the number of cutter teeth, and $\Delta \theta_{m,k}$ is the angle by which the m-th cutter tooth is ahead of the k-th cutter tooth in the rotation direction of the tool.

It is noted here that although $\Delta \theta_{m,k}$ is impacted by runout and asymmetry in wear, the magnitude of runout and asymmetry in wear is much less than the actual cutting radius, so that this impact is negligible and that $\Delta \theta_{m,k}$ is determined by the original spacing angle of the tool.

The measurement method of undeformed chip thickness in micro-milling according to the present invention allows undeformed chip thickness measurement in micro-milling without measuring the tool runout and wear in advance, which significantly shortens the measurement flow and improves the measurement efficiency while effectively ensuring the measurement accuracy.

To prove the effectiveness of the measurement method of undeformed chip thickness in micro-milling according to the present invention, the micro-milling straight slot using a four-tooth flat-end milling tool is taken as an example, in which the feed per tooth is 2 μm and the feed per revolution is 1 μm. The undeformed chip thickness micro-milling is measured in the following detailed steps:

First step: selecting a distance on the central line of the flute bottom of a length equal to the feed per revolution (8 μm) and extracting a corresponding surface contour height, the peak of the contour height representing the tool mark.

Second step: in the case where there are four tool marks on the extracted central line of the length of 8 μm, indicating that all the four cutter teeth are engaged in cutting, measuring the space between adjacent tool marks as $d_{1,4}$=2.2 μm, $d_{4,3}$=1.9 μm, $d_{3,2}$=2.3 μm, $d_{2,1}$=1.7 μm.

Third step: calculating the difference of equivalent radius between adjacent cutter teeth according to the formula (1) as:

$\Delta R_{1,4}$=0.2 μm, $d_{4,3}$=0.2 μm, $d_{3,2}$=0.3 μm, $d_{2,1}$=−0.3 μm

Figure 2:
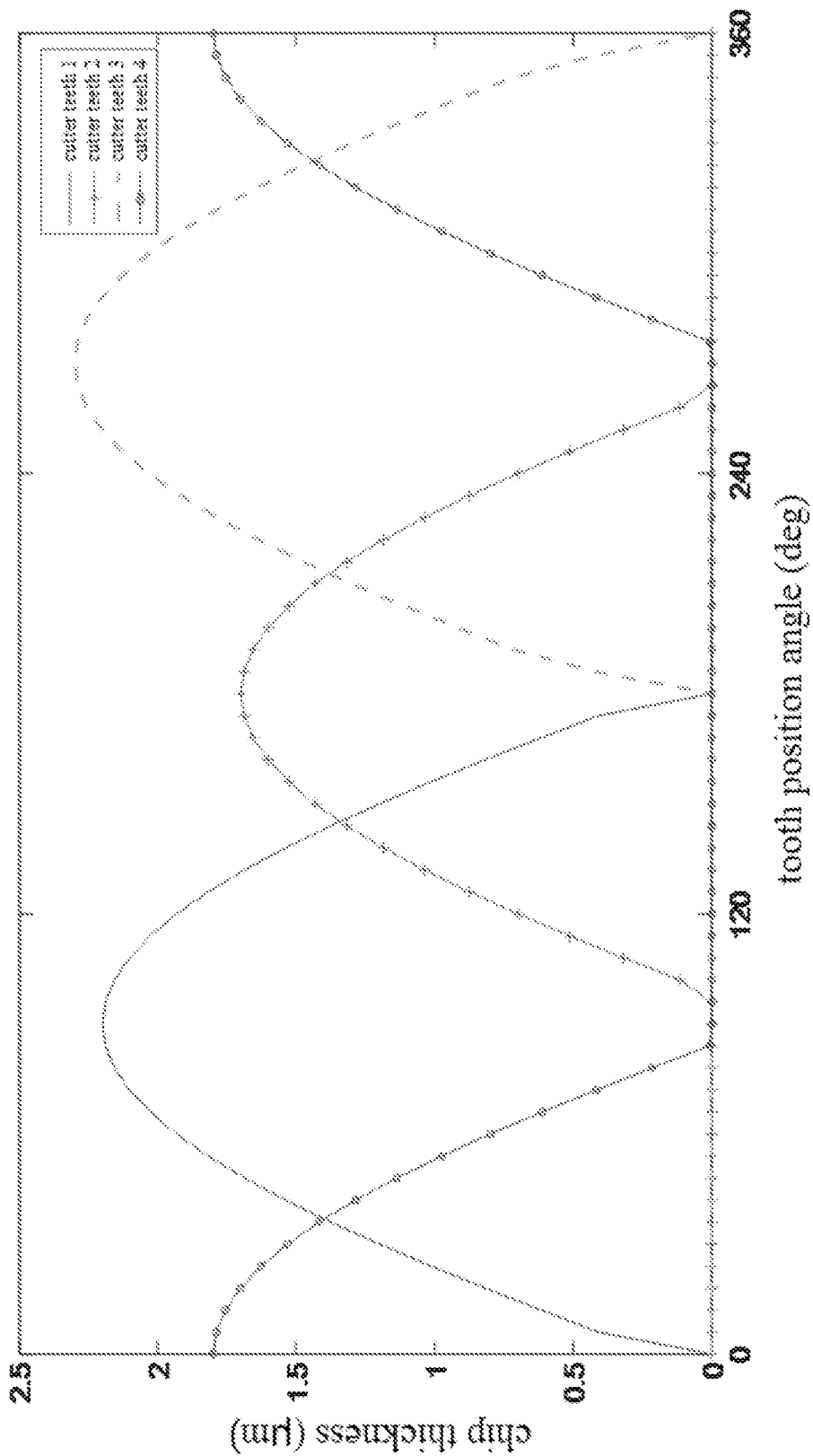
FIG. 2 shows the instant undeformed chip thickness obtained by the measurement method of undeformed chip thickness in micro-milling according to the first embodiment of the present invention.

Fourth step: calculating the instantaneous undeformed chip thickness of each cutter tooth at any one tooth position angle according to the formula (3), with the results being shown in FIG. 2. These results are highly consistent with actual data, which proves that the measurement method of undeformed chip thickness in micro-milling according to the present invention can effectively ensure the measurement accuracy.

Second Embodiment

This embodiment discloses a measurement system of undeformed cutting thickness in micro-milling, including the following modules.

An acquisition module is configured to acquire a surface topography picture of the bottom of a flute after micro-milling. Optionally, the surface topography picture of the bottom of a flute after micro-milling is acquired by an optical microscope and has high contrast and resolution.

A tool mark extraction module is configured to extract a tool mark at the central line of the flute from the surface topography picture.

A spacing distance calculation module for adjacent tool marks is configured to calculate a spacing distance between adjacent tool marks.

A calculation module of equivalent cutting radius difference is configured to calculate the difference of equivalent cutting radius between adjacent cutter teeth based on the spacing distance between adjacent tool marks.

Specifically, the calculating the difference of equivalent cutting radius between adjacent cutter teeth based on the spacing distance between adjacent tool marks includes:

if all the cutter teeth are engaged in cutting, then calculating the difference of equivalent cutting radius $\Delta R_{k,k-1}$ between adjacent cutter teeth based on the space between adjacent tool marks according to the formula:

$$\Delta R_{k,k-1} = d_{k,k-1} - f_z$$

where $d_{k,k-1}$ is the spacing distance between adjacent tool marks and $f_z$ is the feed per tooth.

Further, the calculating the difference of equivalent cutting radius between adjacent cutter teeth based on the spacing distance between adjacent tool marks further includes:

if there is any cutter tooth that is not engaged in cutting, then setting the difference between the equivalent radius of the cutter tooth that is not engaged in cutting and the equivalent radius of any one cutter tooth to negative infinity; and for the cutter tooth engaged in cutting, calculating the difference of equivalent radius between adjacent cutter teeth based on the formula:

$$\Delta R_{k,k-i} = d_{k,k-i} - i \cdot f_z$$

where i is the difference of sequence number between two adjacent cutter teeth engaged in cutting.

In this step, if there is any cutter tooth that is not engaged in cutting, the sequence number of the cutter tooth that is not engaged in cutting is determined based on the periodicity of a cutting force signal.

The formulas (1) and (2) in combination can determine the difference of equivalent radius $\Delta R_{k,m}$ between any two cutter teeth, where k represents the k-th cutter tooth and m represents the m-th cutter tooth.

An undeformed chip thickness calculation module is configured to reconstruct the instantaneous undeformed chip thickness in micro-milling based on the difference of equivalent cutting radius between adjacent cutter teeth.

Specifically, the instantaneous undeformed chip thickness in micro-milling is reconstructed based on the difference of equivalent cutting radius between any two cutter teeth according to the formula:

$$h_k(\theta) = \max\left\{\min_m\left[\Delta R_{k,m} + f_z \sin(\theta_k)\frac{M \cdot \Delta \theta_{m,k}}{2\pi}\right], 0\right\}$$

where $h_k(f)$ is the instantaneous undeformed chip thickness of the k-th cutter tooth at the reference tooth position angle θ, $\Delta R_{k,m}$ is the difference of equivalent radius between any two cutter teeth, $\theta_k$ is the rotation angle of the k-th cutter tooth at the reference tooth position angle θ, M is the number of cutter teeth, and $\Delta\theta_{m,k}$ is the angle by which the m-th cutter tooth is ahead of the k-th cutter tooth in the rotation direction of the tool.

It is noted here that although $\Delta\theta_{m,k}$ is impacted by runout and asymmetry in wear, the magnitude of runout and asymmetry in wear is much less than the actual cutting radius, so that this impact is negligible and that $\Delta\theta_{m,k}$ is determined by the original spacing angle of the tool.

The measurement system of undeformed chip thickness in micro-milling according to the present invention allows undeformed chip thickness measurement in micro-milling without measuring the tool runout and wear in advance, which significantly shortens the measurement flow and improves the measurement efficiency while effectively ensuring the measurement accuracy.

The above embodiments are merely preferred embodiments for fully explaining the present invention, and the scope of protection of the present invention is not limited thereto. Equivalent substitutions or changes made by those skilled in the art on the basis of the present invention shall fall within the scope of protection of the present invention. The scope of protection of the invention is defined by the claims.

What is claimed is:

1. A measurement method of undeformed chip thickness in micro-milling, comprising the steps of:
    S1: acquiring a surface topography picture of the bottom of a flute after micro-milling;
    S2: extracting a tool mark at the central line of the flute from the surface topography picture;
    S3: calculating a spacing distance between adjacent tool marks and calculating the difference of equivalent cutting radius between adjacent cutter teeth based on the spacing distance between adjacent tool marks; and
    S4: reconstructing the instant undeformed chip thickness in micro-milling based on the difference of equivalent cutting radius between adjacent cutter teeth.

2. The measurement method of undeformed chip thickness in micro-milling of claim 1, wherein in the step S3:
    if all the cutter teeth are engaged in cutting, then the difference of equivalent cutting radius $\Delta R_{k,k-1}$ between adjacent cutter teeth is calculated based on the spacing distance between adjacent tool marks according to the formula:

$$\Delta R_{k,k-1} = d_{k,k-1} - f_z$$

where $d_{k,k-1}$ is the spacing distance between adjacent tool marks and $f_z$ is the feed per tooth.

3. The measurement method of undeformed chip thickness in micro-milling of claim 2, wherein in the step S3:
    if there is any cutter tooth that is not engaged in cutting, then the difference between the equivalent radius of the cutter tooth that is not engaged in cutting and the equivalent radius of any one cutter tooth is set to negative infinity; and for the cutter tooth engaged in cutting, the difference of equivalent radius between adjacent cutter teeth is calculated based on the formula:

$$\Delta R_{k,k-i} = d_{k,k-i} - i \cdot f_z$$

where i is the difference of sequence number between two adjacent cutter teeth engaged in cutting.

4. The measurement method of undeformed chip thickness in micro-milling of claim 3, wherein if there is any cutter tooth that is not engaged in cutting, the sequence number of the cutter tooth that is not engaged in cutting is determined based on the periodicity of a cutting force signal.

5. The measurement method of undeformed chip thickness in micro-milling of claim 1, wherein in the step S4, the instant undeformed chip thickness in micro-milling is reconstructed based on the difference of equivalent cutting radius between any two cutter teeth according to the formula:

$$h_k(\theta) = \max\left\{\min_m\left[\Delta R_{k,m} + f_z\sin(\theta_k)\frac{M \cdot \Delta\theta_{m,k}}{2\pi}\right], 0\right\}$$

where $h_k(\theta)$ is the instant undeformed chip thickness of the k-th cutter tooth at the reference tooth position angle θ, $\Delta R_{k,m}$ is the difference of equivalent radius between any two cutter teeth, $\theta_k$ is a rotation angle of the k-th cutter tooth at the reference tooth position angle θ, M is the number of cutter teeth, and $\Delta\theta_{m,k}$ is the angle by which the m-th cutter tooth is ahead of the k-th cutter tooth in the rotation direction of the tool.

6. The measurement method of undeformed chip thickness in micro-milling of claim 1, wherein in the step S1, a surface topography picture of the bottom of a flute after micro-milling is acquired by an optical microscope.

7. A measurement system of undeformed chip thickness in micro-milling, comprising:
    an acquisition module configured to acquire a surface topography picture of the bottom of a flute after micro-milling;
    a tool mark extraction module configured to extract a tool mark at the central line of the flute from the surface topography picture;
    a spacing distance calculation module for adjacent tool marks configured to calculate a spacing distance between adjacent tool marks; and
    a calculation module of equivalent cutting radius difference configured to calculate the difference of equivalent cutting radius between adjacent cutter teeth based on the spacing distance between adjacent tool marks; and
    an undeformed chip thickness calculation module configured to reconstruct the instant undeformed chip thickness in micro-milling based on the difference of equivalent cutting radius between adjacent cutter teeth.

8. The measurement system of undeformed chip thickness in micro-milling of claim 7, wherein calculating the difference of equivalent cutting radius between adjacent cutter teeth based on the spacing distance between adjacent tool marks comprises:
    if all the cutter teeth are engaged in cutting, then calculating the difference of equivalent cutting radius $\Delta R_{k,k-1}$ between adjacent cutter teeth based on the spacing distance between adjacent tool marks according to the formula:

$$\Delta R_{k,k-1} = d_{k,k-1} - f_z$$

where $d_{k,k-1}$ is the spacing distance between adjacent tool marks and $f_z$ is the feed per tooth.

9. The measurement system of undeformed chip thickness in micro-milling of claim 8, wherein the calculating the difference of equivalent cutting radius between adjacent cutter teeth based on the spacing distance between adjacent tool marks further comprises:

if there is any cutter tooth that is not engaged in cutting, then setting the difference between the equivalent radius of the cutter tooth that is not engaged in cutting and the equivalent radius of any one cutter tooth to negative infinity; and for the cutter tooth engaged in cutting, calculating the difference of equivalent radius between adjacent cutter teeth based on the formula:

$$\Delta R_{k,k-i} d_{k,k-i} \cdot f_z$$

where i is the difference of sequence number between two adjacent cutter teeth engaged in cutting.

10. The measurement system of undeformed chip thickness in micro-milling of claim 7, wherein the instantaneous undeformed chip thickness in micro-milling is reconstructed based on the difference of equivalent cutting radius between any two cutter teeth according to the formula:

$$h_k(\theta) = \max\left\{\min_m\left[\Delta R_{k,m} + f_z \sin(\theta_k)\frac{M \cdot \Delta\theta_{m,k}}{2\pi}\right], 0\right\}$$

where $h_k(\theta)$ is the instantaneous undeformed chip thickness of the k-th cutter tooth at the reference tooth position angle $\theta$, $\Delta R_{k,m}$ is the difference of equivalent radius between any two cutter teeth, $\theta_k$ is a rotation angle of the k-th cutter tooth at the reference tooth position angle $\theta$, M is the number of cutter teeth, and $\Delta\theta_{m,k}$ is the angle by which the m-th cutter tooth is ahead of the k-th cutter tooth in the rotation direction of the tool.

* * * * *

UNITED STATES PATENT AND TRADEMARK OFFICE
CERTIFICATE OF CORRECTION

PATENT NO. : 11,869,180 B1
APPLICATION NO. : 18/032445
DATED : January 9, 2024
INVENTOR(S) : Tongshun Liu et al.

It is certified that error appears in the above-identified patent and that said Letters Patent is hereby corrected as shown below:

On the Title Page

(72) third inventor, changed from:
"Chengdong Wang, Yihui (CN)"
To:
"Chengdong Wang, Suzhou (CN)"

Signed and Sealed this
Thirteenth Day of February, 2024

Katherine Kelly Vidal
*Director of the United States Patent and Trademark Office*